United States Patent [19]

Torino, Jr. et al.

[11] Patent Number: 4,499,466
[45] Date of Patent: Feb. 12, 1985

[54] METHOD OF PRODUCING VELOCITY-AIDED RANGE GATES

[75] Inventors: Arthur J. Torino, Jr., Merrimack, N.H.; George A. Bouchard, Arlington; Philip A. Keane, North Reading, both of Mass.

[73] Assignee: Raytheon Company, Lexington, Mass.

[21] Appl. No.: 394,243

[22] Filed: Jul. 1, 1982

[51] Int. Cl.³ .............................................. G01S 13/70
[52] U.S. Cl. ...................................................... 343/7.3
[58] Field of Search ......................................... 343/7.3

[56] References Cited

U.S. PATENT DOCUMENTS

| | | | |
|---|---|---|---|
| 3,713,149 | 1/1973 | Bruner et al. | 343/7.3 X |
| 3,716,858 | 2/1973 | Worthington | 343/7.3 |
| 3,769,589 | 10/1973 | Buntschuh et al. | 343/7.3 X |
| 3,813,670 | 5/1974 | Alpers | 343/7.3 |
| 3,875,391 | 4/1975 | Shapiro et al. | 235/156 |
| 4,037,202 | 7/1977 | Terzian | 364/200 |
| 4,156,875 | 5/1979 | Keane et al. | 343/7.3 |
| 4,217,581 | 8/1980 | Prickett | 343/7.3 |
| 4,232,315 | 11/1980 | Kern | 343/7.3 |

*Primary Examiner*—T. H. Tubbesing
*Attorney, Agent, or Firm*—Philip J. McFarland; Joseph D. Pannone

[57] ABSTRACT

A method of producing a control signal for a range gate in a pulse Doppler radar, the method encompassing the steps of periodically determining the range slip of a selected target and then changing the position of a range gate during each range sweep in accordance with the determined range slip.

1 Claim, 12 Drawing Figures

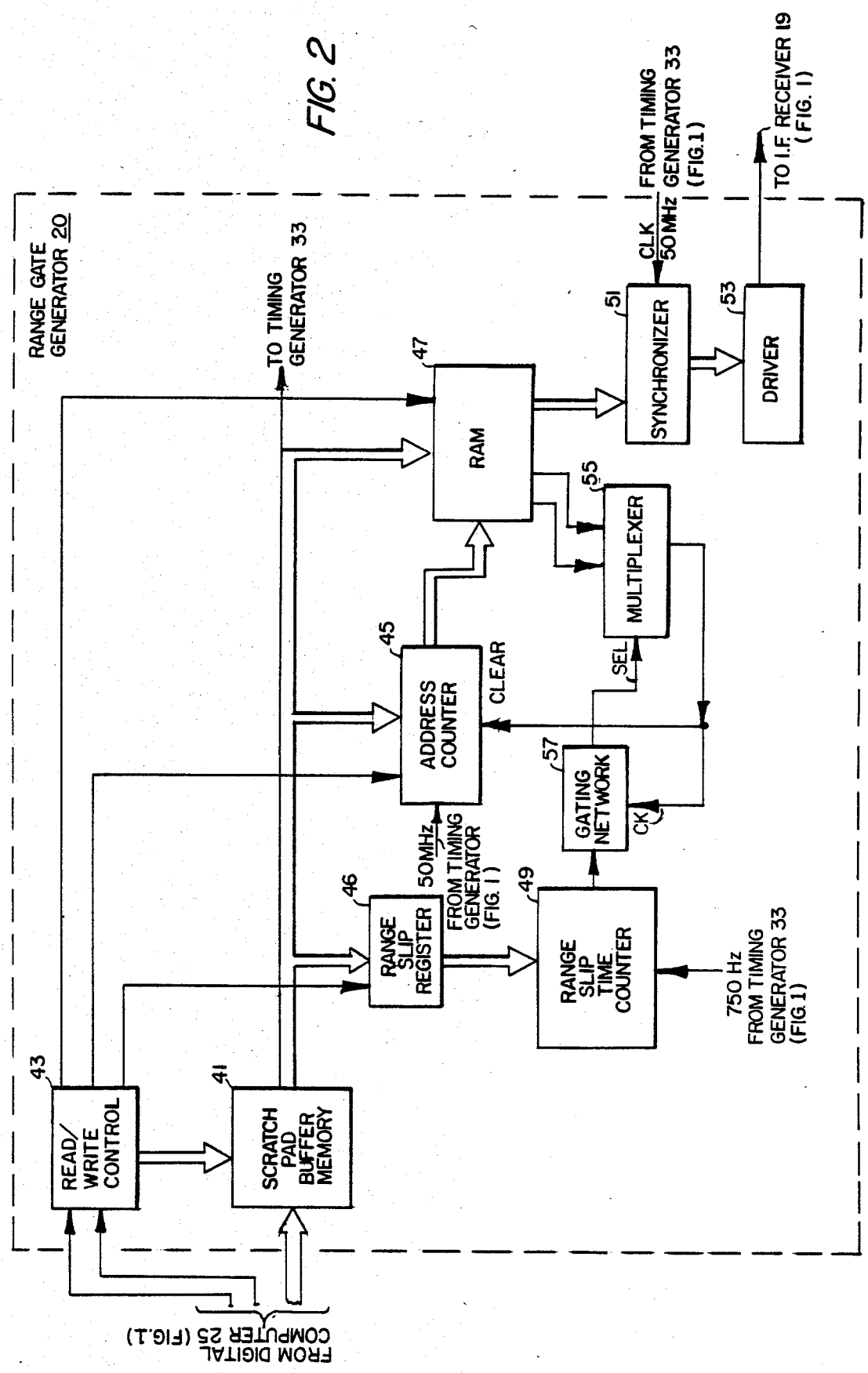

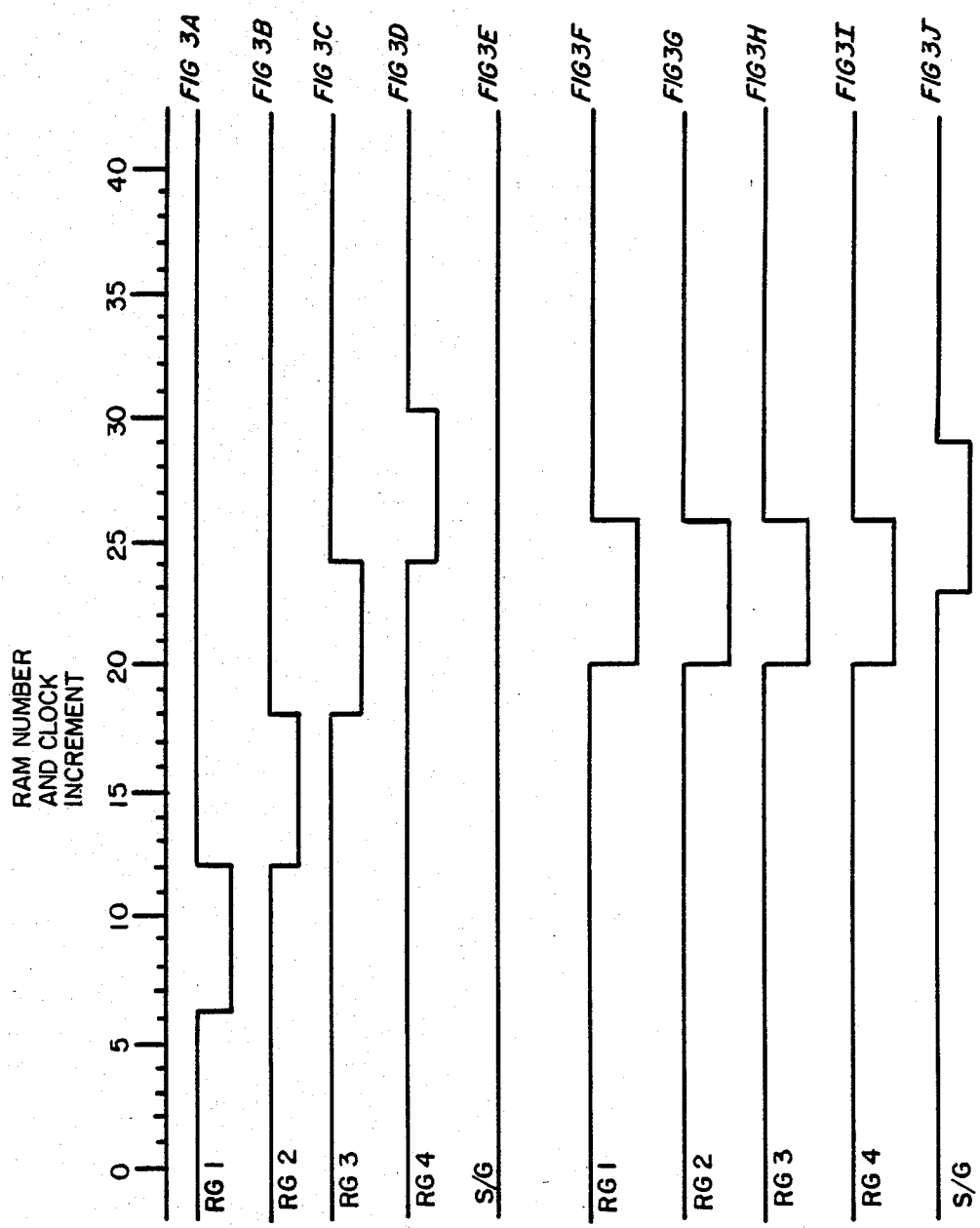

METHOD OF PRODUCING VELOCITY-AIDED RANGE GATES

BACKGROUND OF THE INVENTION

This invention pertains generally to pulse Doppler radar tracking systems, and particularly to an improved range gating control circuitry for use in such type of system to position a range gate around echo signals from a moving target.

It is a fundamental precept that the time for a radar pulse to travel to and from a target is a function of the range between a radar and a target. If a target is approaching or moving away from a radar, i.e., if a so-called Doppler velocity is experienced, then the range between the target and the radar changes and a concomitant change in the time of arrival of successive echo signals from the target is experienced. The magnitude of such change in the time of arrival is of particular importance for a pulse radar installed on a guided missile incorporating a range gating technique to reduce the effects of interfering signals, such as returns from other targets in a formation or from clutter. In such an application, for example, if a typical radar dwell is 10 milliseconds and a Doppler velocity of 6,000 feet per second exists, the time of arrival of echo signals will change by 120 nanoseconds from beginning to end of such a dwell. Thus, with a "100 nanosecond" range gate, properly positioned at the beginning of such a radar dwell, the change in the time of arrival of echo signals will exceed the width of the range gate, meaning that echo signals will be lost. A technique, referred to in the art as "velocity-aiding", then must be utilized to change the position of a range gate during a radar dwell in accordance with the Doppler velocity between a target and the guided missile to avoid loss of echo signals.

Known ways to achieve velocity-aiding are subject to the difficulty that undesirable spreading of echo signals from clutter is experienced with an accompanying degradation of resolution. Notwithstanding the spreading of the spectrum of clutter, velocity-aiding is useful, even in the terminal phase of an intercept in which there may be several targets flying in formation. In such a situation, the Doppler frequency of each target is almost identical so that, if in a tight formation, tracking on the centroid of the formation may occur. However, because the ratio of the levels of echo signals from targets and clutter ratio is favorable during the terminal phase of an intercept, velocity-aided range gates may be used to track a particular target in the formation.

One known velocity-aided range gate generator is described in U.S. Pat. No. 4,156,875 issued May 29, 1979 to inventors Keane et al. and assigned to the same assignee as the present invention. Briefly, such a range gate generator is operative to change, by either one of two fixed increments, the interval between the time of each transmitted pulse and the time at which each associated range gate is generated. The increments chosen by patentees is ±20 nanoseconds, depending upon the sign of the Doppler velocity. Thus, when the Doppler velocity is positive, indicating that the range between missile and target is decreasing with time, the increment actually chosen is −20 nanoseconds; on the other hand, when the Doppler velocity is negative, the increment actually chosen is +20 nanoseconds. In almost all tactical situations the increment actually chosen is adequate, meaning that coincidence between the echo signal from a target being tracked and each successively generated range gate is maintained. There are, however, tactical situations in which the use of either one of a fixed increment in the order of ±20 nanoseconds may not be desirable. For example, if a desired target is an aircraft in a formation of aircraft and tracking is being carried out using a so-called "split-gate", echo signals from aircraft other than the desired target may come into the range gate, especially during the terminal phase of an intercept. At best, then, tracking on the centroid of the targets whose echo signals are in the range gate will take place; at worst, tracking on an unwanted target will occur.

SUMMARY OF THE INVENTION

With this background of the invention in mind, it is therefore a primary object of this invention to provide an improved velocity-aided range gate generator operating under the control of a digital computer so as to adapt the incremental change in the position of a range gate in accordance with the Doppler velocity experienced in any tactical situation.

The foregoing and other objects of this invention are generally attained by providing, in a radar carried by a guided missile intercepting an airborne target, an improved range gate generator wherein, prior to each radar dwell, a random access memory (RAM) is loaded by a digital computer with a truth table (i.e., a set of logic level zeros and ones) at successive addresses to define the beginning and end of each one of a number (here four) of range gates and a split gate. During operation, the contents of the RAM are periodically updated in accordance with the Doppler velocity of a selected target and the desired duration of range gates. Between each update, the contents of the RAM are read in such a manner that, during successive pulse repetition intervals, the amount and direction of range gate slip corresponds to that required to compensate for the Doppler velocity of the selected target and the duration of each range gate is set to an optimum length.

BRIEF DESCRIPTION OF THE DRAWINGS

Other objects and many of the attendant advantages of the invention will be readily appreciated as the same become better understood by reference to the following detailed description when considered in connection with the accompanying drawings wherein:

FIG. 2 is a simplified block diagram of a range gate generator to produce velocity-aiding according to the invention; and FIGS. 3A through 3J are two series of timing diagrams useful in understanding the operation of the range gate generator of FIG. 2 in a search and tracking mode of operation of the active seeker shown in FIG. 1.

DESCRIPTION OF THE PREFERRED EMBODIMENT

Figure 1:
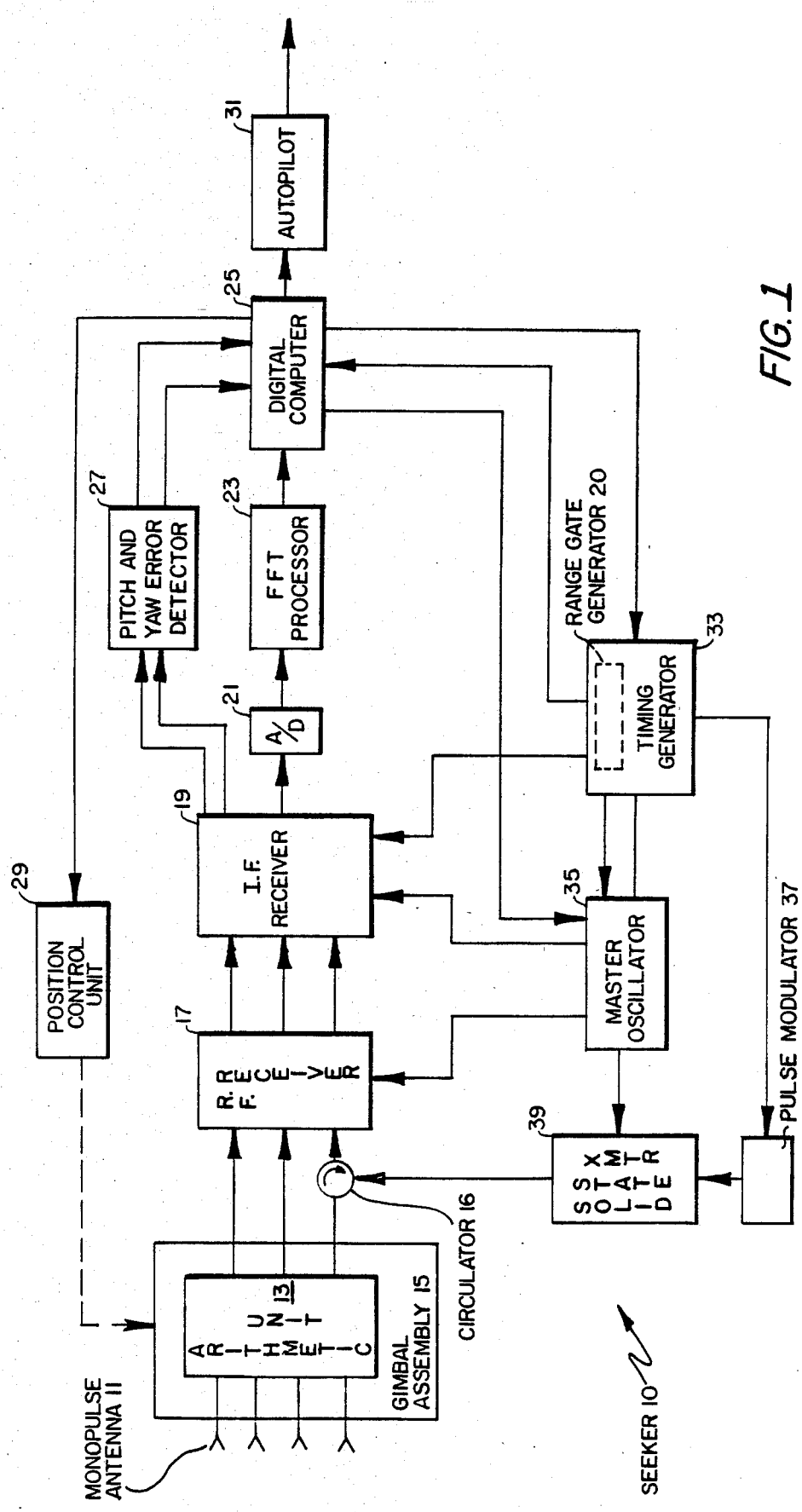
FIG. 1 is a simplified block diagram of an active seeker for a guided missile wherein the contemplated range gate generator is substituted for a known range gate generator to center a range gate about the returns from a moving target in the way contemplated by the invention.

Before referring to the Figures, it will be noted that only those portions of the circuitry in an active seeker for a guided missile that are necessary to an understanding of the contemplated invention are indicated. In addition, the various elements in the Figures that are known in the art are simply shown in block form, it being deemed sufficiently instructive to a person of ordinary skill in the art to reproduce the preferred embodiment of the invention.

Referring now to FIG. 1, a seeker 10 (here an active radar seeker) employing a range gate generator 20 is shown to include a velocity-aiding arrangement (illustrated in FIG. 2) to ensure that echo signals from a target (not shown) are effectively centered within a range gate during an engagement. The seeker 10 includes a monopulse antenna 11 and a monopulse arithmetic unit 13 mounted on a gimbal assembly 15. The monopulse arithmetic unit 13 is operative to produce, in a conventional manner, monopulse pitch and yaw error signals and a monopulse sum signal. The pitch and yaw error signals are passed directly to a radio frequency (R.F.) receiver 17 while the sum signal is passed via a circulator 16 to such receiver wherein the monopulse sum and error signals are amplified and downconverted to signals at a first intermediate frequency (I.F.). Such signals are passed through an I.F. receiver 19 wherein the functions of automatic gain control (AGC), i.e. downconversion to signals at a second intermediate frequency, range gating, filtering, multiplexing and downconversion to baseband signals (which are bipolar video in-phase (I) and quadrature phase (Q) signals), are carried out. The baseband signals derived from the monopulse sum signal are digitized in an analog-to-digital (A/D) converter 21 and then passed to a Fast Fourier Transform (FFT) signal processor 23. Such processor is of conventional design, for example, that described in U.S. Pat. No. 3,875,391, issued Apr. 1, 1975 to inventors Shapiro et al and assigned to the same asignee as the present invention. The output of the FFT signal processor 23 (which consists of signals describing the frequency spectrum of the range-gated monopulse sum signal) is passed to a digital computer 25. The baseband signals derived from the monopulse pitch and yaw error signals are demodulated and digitized in a pitch and yaw error detector 27 and then passed to the digital computer 25 (which may be similar to that described in U.S. Pat. No. 4,037,202, issued July 19, 1977 to inventor John Terzian and assigned to the same assignee as the present invention). The digital computer 25 is operative to provide target bearing information to a position control unit 29 and to an autopilot 31 to control the gimbal assembly 15 and the autopilot 31 in a known way. The digital computer 25 also supplies control signals to a timing generator 33, which includes the range gate generator 20 (to be described in detail hereinbelow with reference to FIG. 2) for controlling the range gates (not shown) within the I.F. receiver 19. The digital computer 25 is also effective to control a master oscillator 35 to close the tracking loops (not shown) in a known way. Completing the seeker 10 are a pulse modulator 37 and a solid state transmitter 39 which are arranged to generate a transmitted pulse train.

Referring now to FIG. 2, the range gate generator 20 of the timing generator 33 (FIG. 1) is shown to include a scratch pad buffer memory 41, a read/write control unit 43, an address counter 45, and a random access memory (RAM 47). The scratch pad buffer memory 41 periodically is loaded with update message words from the digital computer 25 (FIG. 1) via a data bus (not numbered) and the read/write control unit 43 is similarly connected to the digital computer 25 (FIG. 1) to receive appropriately timed control signals. The update message words stored in the scratch pad buffer memory 41 are transferred under control of the read/write control unit 43, to a range slip register 46, the address counter 45 and the RAM 47. The range slip time counter 49, which is clocked at a 750 Hz rate provided by a clock (not shown) in the timing generator 33 (FIG. 1) receives a VELOCITY AIDING ESTIMATE word representative of the missile-to-target closing velocity from the range slip register 46. The address counter 45 is loaded via a select code with a start address and controlled via a word count as will be explained in detail hereinbelow. The RAM 47, which here is a 128 word by 7 bit device, is loaded with a truth table corresponding to the status of the individual range gates for each interval following each update message word. Exemplary truth tables and the results of reading such tables are shown hereinafter.

The address counter 45, which here is clocked at a 50 MHz rate by a clock (not shown) within the timing generator 33 (FIG. 1), increments the RAM address every 20 nanosecond clock period to produce output signals from the RAM 47 in accordance with the contents of RAM 47. The range gate status signals from the RAM 47 are re-synchronized to the 50 MHz clock within a synchronizer 51, which here may be a known network of multivibrators. The synchronized range gate control signals from the synchronizer 51 are passed via a driver network 53 as control signals to the range gates (not shown) within the I.F. receiver 19 (FIG. 1). The driver network 53 is here of conventional design and simply comprises a series of emitter-coupled logic (ECL) to transistor-transistor logic (TTL) converters. It will now be appreciated by those of skill in the art that because of the relatively high speed of operation (50 MHz) of the address counter 45, the RAM 47 and the synchronizer 51, these devices must be ECL devices.

The two most significant bits in each word from the RAM 47 corresponding respectively to a pulse repetition interval (PRI) control bit or a velocity-aided PRI control bit, are passed to a multiplexer 55. The output signal from that matrix is passed (as a CLEAR command to the address counter 45) to a gating network 57 (here a pair of flip/flops). The CLEAR command to the address counter 45 resets that device to its initial address, thereby repeating the process for the next PRI. The gating network 57 also receives an input from the range slip time counter 49. As mentioned hereinabove, the latter is loaded with a VELOCITY AIDING ESTIMATE word from the digital computer 25 (FIG. 1) via the register which is loaded from the scratch pad buffer memory 41. Once the VELOCITY AIDING ESTIMATE word is counted, the range slip time counter 49 triggers the gating network 57 which, in turn, changes the level (from a logic level zero to a logic level one) of the control signal provided to the multiplexer 55. That matrix then is conditioned to select as an output the velocity-aided PRI bit (or "flag") from the RAM 47. As previously mentioned, the PRI bit (or "flag") and the velocity-aided PRI bit are contained at different locations within the RAM 47. The difference between the locations of the PRI flag and the velocity-aided PRI flag, which is controlled by the digital computer 25 (FIG. 1), governs the amount and direction of the range gate slip. The velocity-aided PRI bit from the multiplexer 55 is effective to clear and restart the address counter 45, as well as change the output signal of the gating network 57 from a logic level one to a logic level zero. Thus, the pulse width of the output signal from the gating network 57 is equal to the velocity-aided PRI. This guarantees that the range gates (not shown) within the I.F. receiver 19 (FIG. 1) are slipped only once each range slip time and that the slip will occur synchronously with the PRI.

As mentioned hereinabove, the RAM 47 is a 128 word by 7 bit ECL device. The RAM 47 is here used to control four range gates as well as a split range gate and is organized as illustrated in Table 1.

TABLE 1

| Bit No. | Function |
| --- | --- |
| 0 | PRI control bit |
| 1 | velocity-aided PRI control bit |
| 2 | split range gate |
| 3 | range gate 4 |
| 4 | range gate 3 |
| 5 | range gate 2 |
| 6 | range gate 1 |

The range of addresses in the RAM 47 are from 0 to 127.

In the preferred mode of operation of the RAM 47 the following rules apply:
(1) A logic 1 represents range gates and split gate OFF; a logic 0 represents range gates and split gate ON.
(2) A logic 1 represents the end, minus one 20 nanosecond clock period, of both the PRI and the velocity-aided PRI; a logic 0 must be placed in all other RAM locations for PRI and velocity-aided PRI.
(3) The first data word, located at address 0 of the RAM 47, must contain a logic level 0 in the first two bits, bit 0 and bit 1.

The scratch pad buffer memory 41 here is a 64 word by 8 bit memory. The extra or eighth bit is required to handle data transfers to an 8 bit RAM (not shown) within the timing generator 33 (FIG. 1). Message words are loaded sequentially into the scratch pad buffer memory 41 starting at location 0 and continuing to location 63. When the last location is loaded (or an END OF DATA control code is detected) the scratch pad buffer memory 41 is switched to a so-called timing generator update mode wherein message words in such memory are sequentially unloaded, starting from location 0, until an END OF DATA control code is read or the scratch pad memory is empty. The scratch pad buffer memory 41 is conditioned to accept message words from the digital computer 25 (FIG. 1). Until an END OF DATA control code is encountered, the RAM 47 (as well as other RAMS, not shown) within the timing generator 33 (FIG. 1) are enabled. It should be noted here that the last message word of each complete data block from the digital computer 25 (FIG. 1) must be an END OF DATA message word. There is, however, no restriction as to the maximum length of an updating data block from the digital computer 25 (FIG. 1) providing sufficient time is allowed for updating the timing generator 33 (FIG. 1) after a block of 64 message words has been transferred to the scratch pad buffer memory 41. Finally, loading of the scratch pad buffer memory 41 may be overlapped with operation of the timing generator 33 (FIG. 1) provided that less than 64 words are sent from the digital computer 25 (FIG. 1) or an END OF DATA message is not sent. The reception of a 64 word message or an END OF DATA message will immediately inhibit operation of the timing generator 33 (FIG. 1).

Information is transferred to the scratch pad buffer memory 41 by data in the lower byte of the message from the digital computer 25 (FIG. 1). Each message (including END OF DATA) contains a 3-word header consisting of an ID byte, a START ADDRESS byte, and a word count byte. The ID byte determines which column of the RAM 47 is to be updated. The word count byte contains the number of words to be updated, which, as will be explained in detail hereinbelow, also controls the width of the range gates (not shown). The byte immediately following the header bytes is a data word to load the RAM 47. In the END OF DATA word the data byte is set to all zeros which also sets the address counter 45 initially to zero.

The RAM 47 is selected by a zero in bit 7 of the ID byte. A particular column of the RAM 47 is selected by setting the appropriate bit in the ID byte to a logic level one, as will be explained in detail hereinbelow. All unselected columns in the RAM 47 remain unchanged.

Referring now to FIGS. 3A through 3J, and recalling that there are four range gates and a split range gate provided within the I.F. receiver 19 (FIG. 1), typical range gate settings for use in the search mode are illustrated in FIGS. 3A to 3E, while corresponding settings for the track mode are illustrated in FIGS. 3F to 3J. Thus, in a typical search mode, range gates 1 through 4 are shown to be set to cover contiguous time (range) segments, while the split range gate (used only in the track mode) is not activated. Range gates 1 through 4 are shown in FIGS. 3F through 3I to cover coincident time (range) segments in a track mode, while the split range gate is shown in FIG. 3J to cover half the range segment of gates 1 through 4.

By way of illustration, to position range gate 1 as shown in FIG. 3A the update message from the digital computer 25 (FIG. 1) to the scratch pad memory 41 (FIG. 2) would be, as illustrated in Table 2, assuming that the RAM 47 (FIG. 2) originally held all 1's for range gate 1.

TABLE 2

| DB 7 | DB 6 | DB 5 | DB 4 | DB 3 | DB 2 | DB 1 | DB 0 | |
| --- | --- | --- | --- | --- | --- | --- | --- | --- |
| 0 | 1 | 0 | 0 | 0 | 0 | 0 | 0 | SELECT RANGE GATE 1 |
| 0 | 0 | 0 | 0 | 0 | 1 | 1 | 0 | START ADDRESS = 6 |
| 1 | 1 | 1 | 1 | 1 | 0 | 0 | 1 | LOAD DATA 6 TIMES |
| 1 | 0 | 1 | 1 | 1 | 1 | 1 | 1 | RANGE GATE 1 ON |

Thus, the update message is effective to instruct the range gate generator 20 (FIG. 2) that range gate 1 is to be activated on the sixth clock pulse and is to remain active for the next six clock pulses, at which time it will be disabled.

The loading of the scratch pad memory 41 by the digital computer 25 (FIG. 1) for the track mode is accomplished in a way similar to that for the search mode. However, because, as is illustrated in FIGS. 3F through 3I, range gates 1 through 4 are time coincident, the update messages may be loaded simultaneously with the RAM 47 (FIG. 2). To control range gates 1 through 4 as illustrated in FIGS. 3F through 3I, respectively, the data transfer between the digital computer 25 (FIG. 1) and the range gate generator 20 (FIG. 2) could be as presented in Table 3, assuming the RAM 47 (FIG. 2) originally held all 1's for range gates 1 through 4.

TABLE 3

| DB 7 | DB 6 | DB 5 | DB 4 | DB 3 | DB 2 | DB 1 | DB 0 | |
|---|---|---|---|---|---|---|---|---|
| 0 | 1 | 1 | 1 | 1 | 0 | 0 | 0 | SELECT RANGE GATES 1 to 4 |
| 0 | 0 | 0 | 1 | 0 | 1 | 0 | 0 | START ADDRESS = 20 |
| 1 | 1 | 1 | 1 | 1 | 0 | 0 | 1 | LOAD DATA 6 TIMES |
| 1 | 0 | 0 | 0 | 0 | 1 | 1 | 1 | RANGE GATES 1 TO 4 ON |

Similarly, to control the split range gate of FIG. 3J, the data transfer between the digital computer 25 (FIG. 1) and the range gate generator 20 (FIG. 2) could be presented in Table 4, again assuming the RAM 47 (FIG. 2) originally held all 1's for the split range gate.

TABLE 4

| DB 7 | DB 6 | DB 5 | DB 4 | DB 3 | DB 2 | DB 1 | DB 0 | |
|---|---|---|---|---|---|---|---|---|
| 0 | 0 | 0 | 0 | 0 | 1 | 0 | 0 | SELECT SPLIT RANGE GATE |
| 0 | 0 | 0 | 1 | 0 | 1 | 1 | 1 | START ADDRESS = 23 |
| 1 | 1 | 1 | 1 | 1 | 0 | 0 | 1 | LOAD DATA 6 TIMES |
| 1 | 1 | 1 | 1 | 1 | 0 | 1 | 1 | SPLIT RANGE GATE ON |

It should now be appreciated that, between blocks of update messages, the range gate controls of FIGS. 3F through 3J will be repeatedly generated by placing a logical 1 in the PRI control bit (DB0) within the RAM 47 (FIG. 2) at some address following address 28. As explained hereinabove, the multiplexer 55 (FIG. 2) will continue to pass the PRI control bit as a CLEAR command to the address counter 45 (FIG. 2) to reset the latter to zero and repeat the addressing sequence that generates the range gate control signals of FIGS. 3A to 3J. As also explained hereinabove, the multiplexer 55 (FIG. 2) will continue to select the PRI control bit to clear the address counter 45 (FIG. 2) until such time as the gating network 57 (FIG. 2) directs the multiplexer 55 (FIG. 2) to select the velocity-aided PRI control bit (DB1) as the clear for the address counter 45 (FIG. 2). The difference in location within the RAM 47 (FIG. 2) of the PRI control bit (meaning the address at which that bit is a logical 1) and the velocity-aided PRI control bit governs the amount and direction of the range slip to effect velocity-aiding.

Having described a preferred embodiment of this invention, it is evident that other embodiments incorporating its concepts will become readily apparent to one of skill in the art. It is felt, therefore, that this invention should not be restricted to its disclosed embodiments, but rather should be limited only by the spirit and scope of the appended claims.

What is claimed is:

1. In the operation of a guidance system for a guided missile in flight, such missile carrying the combination of a pulse Doppler radar and a digital computer to derive digital signals representative of the position of a selected target relative to such missile during an intercept and representative of the then existing Doppler velocity between such missile and target, the method of generating a range gate compensated for Doppler velocity, such method comprising the steps of:
   (a) firstly, periodically recording the then existing digital signals out of the digital computer to provide corresponding digital signals extant in each interval between recording, each such interval being greater than the pulse repetition interval of the pulse Doppler radar;
   (b) secondly, transferring the extant digital signals indicative of the position of the selected target to a random access memory and the extant digital signals indicative of the Doppler velocity to a counter;
   (c) addressing the random access memory and actuating the counter at different rates to produce a velocity-aided range gate control signal, the time of occurrence of such control signal after each transmitted pulse being varied in accordance with extant digital signals indicative of Doppler velocity; and
   (d) synchronizing the velocity-aided range gate control signal with each pulse transmitted by the pulse Doppler radar.

* * * * *